(12) United States Patent
Ahn et al.

(10) Patent No.: US 11,798,709 B2
(45) Date of Patent: Oct. 24, 2023

(54) CABLE COMPRISING CROSSLINKED LAYER OBTAINED FROM A POLYMER COMPOSITION COMPRISING NITRILE RUBBER AND ETHYLENE METHYL ACRYLATE COPOLYMER

(71) Applicant: NEXANS, Courbevoie (FR)

(72) Inventors: Dae-Up Ahn, Chungcheongbuk-do (KR); Jong-Chan Lim, Chungcheongbuk-do (KR)

(73) Assignee: NEXANS, Courbevoie (FR)

( * ) Notice: Subject to any disclaimer, the term of this patent is extended or adjusted under 35 U.S.C. 154(b) by 170 days.

(21) Appl. No.: 17/102,729

(22) Filed: Nov. 24, 2020

(65) Prior Publication Data
US 2021/0166837 A1 Jun. 3, 2021

(30) Foreign Application Priority Data
Nov. 28, 2019 (KR) .......................... 10-2019-0155368

(51) Int. Cl.
| | |
|---|---|
| H01B 7/295 | (2006.01) |
| H01B 7/18 | (2006.01) |
| C08L 23/08 | (2006.01) |
| C08L 33/12 | (2006.01) |
| C08L 33/20 | (2006.01) |
| C08K 5/14 | (2006.01) |
| C08K 3/22 | (2006.01) |

(52) U.S. Cl.
CPC .......... *H01B 7/187* (2013.01); *C08L 23/0853* (2013.01); *C08L 33/12* (2013.01); *C08L 33/20* (2013.01); *C08K 5/14* (2013.01); *C08K 2003/2224* (2013.01); *C08K 2003/2227* (2013.01); *C08L 2203/202* (2013.01)

(58) Field of Classification Search
CPC ...................................................... H01B 7/295
See application file for complete search history.

(56) References Cited

U.S. PATENT DOCUMENTS

| | | | |
|---|---|---|---|
| 2011/0162868 A1* | 7/2011 | Torgersen | C08L 23/0846 |
| | | | 252/511 |
| 2011/0209898 A1* | 9/2011 | Kibe | H01B 7/2806 |
| | | | 174/120 SR |
| 2019/0304624 A1* | 10/2019 | Szylakowski | H01B 7/295 |

FOREIGN PATENT DOCUMENTS

| | | | |
|---|---|---|---|
| CN | 103360675 | | 10/2013 |
| JP | 2016-020450 | * | 2/2016 |
| KR | 1020180043631 | | 4/2018 |
| KR | 1020190053968 | | 5/2019 |

OTHER PUBLICATIONS

KIPO Notification of Provisional Refusal dated Dec. 20, 2021.
KIPO Notification of Provisional Refusal dated May 31, 2021.

* cited by examiner

*Primary Examiner* — Chau N Nguyen
(74) *Attorney, Agent, or Firm* — Sofer & Haroun, LLP

(57) ABSTRACT

The present invention relates to a cable comprising a crosslinked layer obtained from a polymer composition, the polymer composition comprising: a polymer blend comprising an ethylene vinyl acetate (EVA) copolymer, nitrile rubber (NBR), and an ethylene-methyl acrylate (EMA) copolymer; a crosslinking agent; and a flame-retardant filler.

17 Claims, 1 Drawing Sheet

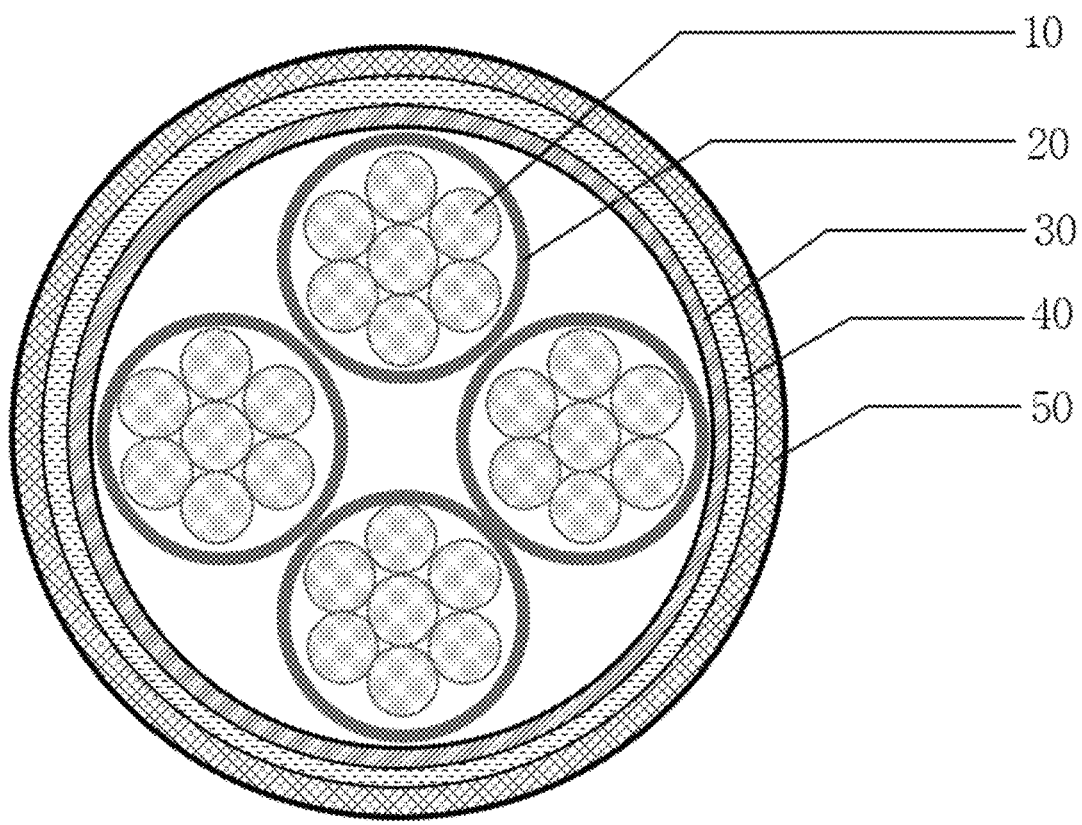

CABLE COMPRISING CROSSLINKED LAYER OBTAINED FROM A POLYMER COMPOSITION COMPRISING NITRILE RUBBER AND ETHYLENE METHYL ACRYLATE COPOLYMER

RELATED APPLICATION

This application claims the benefit of priority from Korean Patent Application No. 2019 0155368, filed on Nov. 28, 2019, the entirety of which is incorporated by reference.

BACKGROUND OF THE INVENTION

Field of the Invention

The present invention relates to a cable comprising a crosslinked layer obtained from a polymer composition, wherein the polymer composition comprises: a polymer blend comprising an ethylene vinyl acetate (EVA) copolymer, nitrile rubber (NBR), and an ethylene-methyl acrylate (EMA) copolymer; a crosslinking agent; and a flame-retardant filler, and to a crosslinkable polymer composition which is used in a cable, and more particularly in the sheath layer of a cable.

Description of the Prior Art

Cables may be used in various applications, including ships and the like. In particular, cables which are used in offshore plants generally refer to cables which are used in oil rigs and oil carriers. Such oil rigs include drill ships, jack-up rigs, and the like, and oil carriers include floating production storage and off-loading vessels (FPSOs) and the like. Such offshore plant cables should have better oil resistance than cables used in general ships, and the flexibility of the cables needs to be maintained even at low temperatures.

In the past, oil resistance required for offshore plant cables was sufficient if their durability against special light oil components or general water-based mud would be satisfied. Recently, however, these cables have also been required to have excellent long-term durability against special drilling mud components, such as ester-based muds, oil-based muds, cement slurries, synthetic oil-based muds, etc.

In addition, in the past, regarding cold resistance required for cables for offshore plants, these cables were required to have flexibility at a temperature of up to −15° C. in accordance with the standard IEC 60092-360. In recent years, however, special requirements that these cables must be able to withstand even at a temperature of −30° C. or lower have been added, making it increasingly difficult to develop cable materials.

In a conventional art, in order to satisfy the oil resistance and cold resistance, chlorine-containing polar resins, such as chloroprene rubber (CR) chlorosulphonated polyethylene (CSM) and chlorinated polyethylene (CPE), which contain a halogen atom, were mainly used in the sheath layers of offshore plant cables (Korean Patent No. 10-0644490). However, when such halogen components were used, a large amount of toxic gases were released in the event of fire, resulting in loss of life, as well as enormous property losses, corrosion of expensive equipment used in offshore structures. Therefore, in recent years, the halogen content has been fundamentally regulated to 0.5% or less in accordance with IEC 60754-1, and thus development of halogen-free cable materials has been required.

In a conventional art, for development of halogen-free cable materials, there were used ethylene-vinyl acetate (EVA) copolymers containing a vinyl acetate polar group in a large amount of 60 wt % or more alone, or blends of said EVA with other resins having a polar group, for example, acrylic resin, nitrile rubber and polyurethane rubber (Korean Patent Application Laid-Open Publication Nos. 10-2013-0094063, 10-2008-0079515, 2003-0035260, and 10-2013-0077322).

An ethylene-vinyl acetate copolymer is a copolymer obtained by polymerizing an ethylene monomer with a vinyl acetate (VA) monomer, and has excellent ozone resistance, chemical resistance, heat resistance and weather resistance. In addition, it has better oil resistance as the content of the polar functional group of vinyl acetate (VA) increases. Hence, in a conventional art, an ethylene-vinyl acetate copolymer having a vinyl acetate content of 60 wt % or more was used in order to satisfy the requirements for the weight and volume change characteristics against aromatic hydrocarbon oil, which are required for the sheath layer of offshore plant cables.

However, when this ethylene-vinyl acetate copolymer having a high content of vinyl acetate was used, the content of ethylene having a relatively high degree of crystallinity was decreased, resulting in deterioration in the mechanical properties of the copolymer. In addition, as the content of vinyl acetate increased, the glass transition temperature of the ethylene-vinyl acetate copolymer increased, so the cold resistance of the copolymer also became weak. In addition, when this ethylene-vinyl acetate copolymer having a high content of a vinyl acetate polar group was used, problems also arose in that the workability of the cable sheathing compound decreases and the material adheres to the interior of operating equipment for the cable extrusion process, resulting in a decrease in discharge rate, which reduces processability and productivity.

Moreover, there is a problem in that a process for producing the ethylene-vinyl acetate copolymer having a high content of a vinyl acetate polar group is very difficult and complicated, and thus it is not easy to produce a large amount of this copolymer. Due to this productivity problem, the raw material price of the ethylene-vinyl acetate copolymer having a high content of a vinyl acetate polar group is high, and thus the compound price may be increased.

Therefore, there is a need for the development of a halogen-free crosslinked polymer composition which satisfies the high oil resistance and mud resistance required for offshore plant cables, preferably without having to use an ethylene-vinyl acetate copolymer having a high content of a vinyl acetate polar group, and which has improved cold resistance, flame retardancy and low smoke generation properties.

SUMMARY OF THE INVENTION

It is an object of the present invention to provide a cable comprising a crosslinked layer, particularly as a sheath layer, obtained from a polymer composition capable of guaranteeing non-halogen properties and flame retardant properties while satisfying cold resistance required for cables, particularly cables for ships or offshore plants.

Another object of the present invention is to provide a crosslinkable polymer composition for use in cables, particularly cables for ships or offshore plants, more particularly for use as a sheath layers of cables.

To achieve the above objects, the present invention provides a cable comprising a crosslinked layer obtained from a polymer composition, the polymer composition comprising:

a polymer blend comprising an ethylene vinyl acetate (EVA) copolymer, nitrile rubber (NBR), and an ethylene-methyl acrylate (EMA) copolymer;
a crosslinking agent; and
a flame-retardant filler.

The ethylene vinyl acetate (EVA) copolymer has a vinyl acetate (VA) content of less than 40 wt % over the total weight of the ethylene vinyl acetate copolymer.

In one embodiment, the nitrile rubber is selected from among nitrile rubber having an acrylonitrile content of 42 to 46 wt %, nitrile rubber having an acrylonitrile content of 36 to 41 wt %, and nitrile rubber having an acrylonitrile content of 31 to 35 wt %, over the total weight of the nitrile rubber. In another embodiment, the ethylene methyl acrylate copolymer is an amorphous polymer, and more preferably an amorphous polymer crosslinkable with organic peroxide, and has an absorbance ratio of 1 to 6. The absorbance ratio can classically be calculated by the following equation 1:

Absorbance ratio=(absorbance by C=O stretch bond)/(absorbance by C—H stretch bond).   [Equation 1]

In another embodiment, the ethylene vinyl acetate copolymer comprises a modified ethylene-vinyl acetate copolymer grafted with a polar group-containing compound.

Preferably, the polymer blend of the present invention comprises, based on 100 parts by weight of the polymer blend, 15 to 30 parts by weight of the ethylene-vinyl acetate copolymer, 35 to 45 parts by weight of the nitrile rubber, and 25 to 50 parts by weight of the ethylene-methyl acrylate copolymer.

In one embodiment, the polymer composition comprises, as the flame-retardant filler, aluminum hydroxide ($Al(OH)_3$), magnesium hydroxide ($Mg(OH)_2$), or a mixture thereof. In another embodiment, the polymer composition comprises organic peroxide as the crosslinking agent.

In one embodiment, the composition according to the present invention may further comprise one or more additives selected from the group consisting of a crosslinking coagent, a plasticizer, a processing aid, an antioxidant, an antiozonant, and an inorganic additive.

Preferably, the polymer composition according to the present invention comprises 100 parts by weight of the polymer blend, 120 to 180 parts by weight of the flame-retardant filler, 0.5 to 10 parts by weight of the crosslinking agent, 0.5 to 7 parts by weight of a crosslinking coagent, 5 to 20 parts by weight of a plasticizer, 0.5 to 5 parts by weight of a processing agent, 0.5 to 7 parts by weight of an antioxidant, 0.1 to 5 parts by weight of an antiozonant, and 1 to 20 parts by weight of inorganic additive, wherein the parts by weight are based on 100 parts by weight of the polymer blend.

Preferably, the crosslinked layer according to the present invention is included as a sheath layer in the cable. Preferably, the cable is a cable for a ship or an offshore plant.

The present invention also provides a crosslinkable polymer composition for use in a sheath layer of a cable, the crosslinkable polymer composition comprising: a polymer blend comprising an ethylene vinyl acetate (EVA) copolymer, nitrile rubber (NBR), and an ethylene-methyl acrylate (EMA) copolymer; a crosslinking agent; and a flame-retardant filler, wherein the ethylene vinyl acetate (EVA) copolymer has a vinyl acetate (VA) of less than 40 wt %, over the total weight of the ethylene vinyl acetate copolymer. Preferably, the composition is for use in a cable for a ship or an offshore plant.

The crosslinked layer obtained from the polymer composition according to the present invention has halogen-free properties, flame retardancy and low smoke generation properties, which are required for cables, and also has high price competitiveness, processability and mechanical properties. Thus, the crosslinked layer may be used to produce a sheath layer for a cable.

In addition, the crosslinked layer obtained from the polymer composition according to the present invention has high oil resistance and mud resistance. Thus, when the crosslinked layer according to the present invention is used as a sheath layer for a cable, the weight or volume or mechanical properties of the sheath layer of the cable can be suppressed from being reduced in a surrounding environment exposed to oil and mud. Thus, the crosslinked layer can be used for cables required to have resistance to oil and mud, such as those that are used in oil rigs, oil carriers, etc.

BRIEF DESCRIPTION OF THE DRAWINGS

FIG. 1 is a cross-sectional view of a cable according to the present invention.

DETAILED DESCRIPTION OF THE INVENTION

Hereinafter, the present invention will be described in more detail.

The present invention provides a crosslinked layer obtained from a polymer composition, the polymer composition comprising: a copolymer blend comprising an ethylene vinyl acetate (EVA) copolymer, nitrile rubber (NBR), and an ethylene-methyl acrylate (EMA) copolymer; a crosslinking agent; and a flame-retardant filler. The ethylene vinyl acetate (EVA) copolymer has a vinyl acetate (VA) content of less than 40 wt %, over the total weight of the ethylene vinyl acetate copolymer.

Polymer Blend

The polymer blend according to the present invention comprises an ethylene vinyl acetate (EVA) copolymer, nitrile rubber (NBR), and an ethylene-methyl acrylate (EMA) copolymer.

More particularly, the ethylene vinyl acetate (EVA) copolymer is a copolymer obtained by polymerizing ethylene and vinyl acetate monomers, and the physical properties thereof are mainly determined by the content of vinyl acetate therein. The ethylene vinyl acetate (EVA) copolymer according to the present invention improves the mechanical properties of the polymer composition according to the present invention. The ethylene vinyl acetate copolymer according to the present invention has a vinyl acetate content of less than 40 wt %, preferably less than 35 wt %, more preferably less than 30 wt %, over the total weight of the ethylene vinyl acetate copolymer. In addition, the ethylene vinyl acetate copolymer according to the present invention preferably has a vinyl acetate content of 10 wt % or more, more preferably 15 wt % or more, even more preferably 20 wt % or more, over the total weight of the ethylene vinyl acetate copolymer. The ethylene vinyl acetate copolymer preferably has a vinyl acetate content of 10 to 35 wt %, more preferably 20 to 30 wt %, over the total weight of the ethylene vinyl acetate copolymer. In one embodiment, the ethylene vinyl acetate copolymer according to the present invention may be contained in the polymer blend in an amount of 10 to 40 wt %, more preferably 15 to 30 wt %, wherein the wt % are based on 100 wt % of the polymer blend.

Preferably, the ethylene vinyl acetate copolymer of the present invention comprises a modified ethylene-vinyl acetate copolymer grafted with a polar group-containing compound. Examples of the ethylene vinyl acetate copolymer include a maleic anhydride-grafted ethylene-vinyl acetate copolymer (MAE-g-EVA), an ethylene-vinyl acetate-maleic anhydride terpolymer, an ethylene-vinyl acetate-acrylic ester-glycidyl methacrylate terpolymer, an ethylene-vinyl acetate-acrylic ester-carboxylated ethylene copolymer, a carboxylated ethylene-vinyl acetate copolymer, and the like.

The nitrile rubber (NBR) is an unsaturated copolymer of 2-propenenitrile and butadiene monomers. More particularly, it contains a large amount of the polar functional group acrylonitrile (AN), and has excellent oil resistance, flame retardancy and abrasion resistance. In one preferred embodiment, the nitrile rubber according to the present invention has an acrylonitrile (AN) content of 25 to 46 wt %, more preferably 31 to 46 wt %, over the total weight of the nitrile rubber. In one embodiment, the nitrile rubber is selected among nitrile rubber having an acrylonitrile content of 42 to 46 wt %, nitrile rubber having an acrylonitrile content of 36 to 41 wt %, and nitrile rubber having an acrylonitrile content of 31 to 35 wt %, over the total weight of the nitrile rubber. This acrylonitrile content may impart improved oil resistance to the composition comprising the nitrile rubber, thus satisfying the requirements for the cable, such as the volume change of IRM 903 oil.

In another preferred embodiment, the nitrile rubber according to the present invention may contain in the polymer blend in an amount of 25 to 60 wt %, preferably 35 to 45 wt %, based on 100 wt % of the polymer blend.

The ethylene-methyl acrylate copolymer (EMA) is a copolymer obtained by polymerizing ethylene and methyl acrylate monomers, has excellent heat resistance, weather resistance, chemical resistance and ozone resistance, and has good oil resistance depending on the content of the polar group methyl acrylate (MA) therein. The ethylene-methyl acrylate copolymer compensates for heat resistance, ozone resistance and weather resistance, which are the disadvantages of the nitrile rubber in the polymer composition according to the present invention. In one preferred embodiment, the ethylene-methyl acrylate copolymer according to the present invention is an amorphous polymer crosslinkable with organic peroxide.

In addition, the ethylene-methyl acrylate copolymer according to the present invention has an absorbance ratio of 1 to 6, preferably 2 to 4. The absorbance ratio according to the present invention is measured by Fourier transform infrared spectroscopy, and is calculated between the ratio of the absorbance by the C—H stretch bond of an ethylene monomer, which is found at a wavelength of 2900 cm$^{-1}$ among IR spectrum absorption peaks, to the absorbance by the C═O carbonyl stretch bond of a methyl acrylate monomer, which is found at a wavelength of 1750 cm$^{-1}$. At this time, the absorbance ratio is calculated using the following equation 1:

Absorbance ratio=(absorbance by C═O stretch bond)/(absorbance by C—H stretch bond)    [Equation 1]

The absorbance ratio according to the present invention increases as the content of methyl acrylate in the ethylene-methyl acrylate copolymer increases. This content of methyl acrylate imparts good oil resistance to the composition. In one preferred embodiment, the ethylene-methyl acrylate copolymer according to the present invention is an ethylene-methyl acrylate copolymer having an absorbance ratio of about 3.2, which is commercially available under the trade name of Vamac DP from Dupont.

In another preferred embodiment, the ethylene-methyl acrylate copolymer according to the present invention may be contained in the polymer blend in an amount of 20 to 60 wt %, more preferably 25 to 50 wt %, wherein the wt % are based on 100 wt % of the polymer blend.

In one preferred embodiment, the polymer blend according to the present invention comprises, based on 100 parts by weight of the polymer blend, 15 to 30 parts by weight of the ethylene-vinyl acetate copolymer, 35 to 45 parts by weight of the nitrile rubber, and 25 to 50 parts by weight of the ethylene-methyl acrylate copolymer.

The polymer composition according to the present invention can advantageously contain no halogenated compound. The halogenated compound may be, for example, a fluorinated polymer or a chlorinated polymer such as polyvinyl chloride (PVC). The polymer composition according to the invention contain no halogenated compound, and therefore does not emit toxic gases such as hydrogen halides upon combustion.

Flame-Retardant Filler

The polymer composition according to the present invention comprises a flame-retardant filler in order to improve the flame retardancy of the composition. The flame-retardant filler according to the present invention has an advantage over halogenated compounds in that it does not generate toxic gases upon combustion. In one embodiment, the flame-retardant filler according to the present invention is an inorganic flame-retardant filler, particularly aluminum hydroxide (Al(OH)$_3$), magnesium hydroxide (Mg(OH)$_2$), or a mixture thereof. In another embodiment, the flame-retardant filler is aluminum hydroxide surface-coated with a surface treating agent, such as vinylsilane, fatty acid, aminopolysiloxane, or the like, or non-surface-treated aluminum hydroxide. In one preferred embodiment, the flame-retardant filler is non-surface-treated aluminum hydroxide. More preferably, it may have a particle size of 0.5 to 1.0 μm and/or a BET specific surface area of 10 to 20 m$^2$/g.

In one preferred embodiment, the content of the inorganic flame-retardant filler is 120 to 180 parts by weight based on 100 parts by weight of the polymer blend.

Crosslinking Agent

The polymer composition according to the present invention comprises a crosslinking agent, in particular an organic peroxide crosslinking agent. The crosslinking agent according to the present invention chemically crosslinks the polymer blend. In one embodiment, the crosslinking agent is organic peroxide. Preferred examples of the crosslinking agent include di-(2,4-dichlorobenzoyl)-peroxide), dibenzoyl peroxide, tert-butyl peroxybenzoate, 1,1-di-(tert-butylperoxy)-3,3,5-trimethylcyclohexane, dicumyl peroxide, di-(2-tert-butyl-peroxyisopropyl)-bezene, tert-butylcumylperoxide, 2,5-dimethyl-2,5-di-(tert-butylperoxy)-hexane, di-tert-butylperoxide, and the like. In one non-limiting embodiment, the crosslinking agent comprises α,α-bis(t-butylperoxy)diisopropyl benzene (Perbutyl P).

In one embodiment of the present invention, the content of the crosslinking agent is 0.5 to 10 parts by weight, more preferably 1 to 5 parts by weight, based on 100 parts by weight of the polymer blend.

Other Additives

The polymer composition according to the present invention may optionally further comprises other additives. The polymer composition may further comprise at least a crosslinking coagent, a plasticizer, a processing aid, an antioxidant, an antiozonant, and an inorganic additive.

In one embodiment, the polymer composition according to the present invention optionally further comprises an antioxidant. The antioxidant serves to prevent the oxidation of the polymer composition and improves the weather resistance/heat resistance properties of the polymer composition. In one embodiment, the composition according to the present invention may comprise a phenol-based antioxidant or an amine-based antioxidant. The phenol-based antioxidant may be selected from the group consisting of pentaerythritol tetrakis(3-(3,5-di-tert-butyl-4-hydroxyphenyl) propionate), octadecyl-3-(3,5-di-butyl-4-hydroxyphenyl)-propionate, 2',3-bis(3-(3,5-di-tert-buthyl-4-hydroxyphenyl) propionyl)propionohydrazide, and combinations thereof. The amine-based antioxidant may be selected from the group consisting of acetone diphenylamine condensates, octylated diphenylamine, 2,2,4-trimethyl-1,2-dihydroquinolne (TMQ), 2-mercaptobenzimidazole (MB), and combinations thereof, and may preferably be a combination of an acetone diphenylamine condensate and 2-mercaptobenzimidazole.

In one preferred embodiment, the polymer composition according to the present invention may comprise, based on 100 parts by weight of the polymer blend, 0.5 to 7 parts by weight of the antioxidant. More preferably, the polymer composition may comprise 0.5 to 4 parts by weight of an acetone diphenylamine condensate and 0.5 to 3 parts by weight of 2-mercaptobenzimidazole.

In another embodiment, the polymer composition according to the present invention optionally further comprises an antiozonant. The antiozonant improves the ozone resistance of the polymer composition, particularly the polymer composition having a high content of nitrile rubber. In one embodiment, the antiozonant may be selected from phenylenediamine-based antiozonants, for example, N-(1,3-dimethylbutyl)-N'-phenyl-p-phenylenediamine (6PPD), N-isopropyl-N'-phenyl-p-phenylenediamine (IPPD), diaryl-p-phenylenediamine (DPPD), and combinations thereof, and is preferably diaryl-p-phenylenediamine. In one preferred embodiment, the polymer composition according to the present invention may comprise the antiozonant in an amount of 0.1 to 5 parts by weight based on 100 parts by weight of the polymer blend. More preferably, it may comprise 0.1 to 2 parts by weight of diaryl-p-phenylenediamine.

In one embodiment, the polymer composition according to the present invention optionally further comprises an organic additive and/or an inorganic additive. Preferably, the organic additive may be a compatibilizer, a plasticizer, a processing oil, a processing aid, a colorant, a coupling agent, and a crosslinking coagent. In another preferred embodiment, the inorganic additive may be metal-based and ceramic-based inorganic additive, such as carbon black, calcium carbonate ($CaCO_3$), talc, kaolin clay, silica, magnesium oxide, zinc oxide, and the like.

In one non-limiting embodiment, the organic additive may be contained in an amount of 100 parts by weight or less, more preferably 50 parts by weight or less, based on 100 parts by weight of the polymer blend. In addition, the inorganic additive may be contained in an amount of 50 parts by weight or less, more preferably 30 parts by weight or less, based on 100 parts by weight of the polymer blend.

Preparation Method

The crosslinked polymer composition according to the present invention may be prepared by a method comprising the steps of:

(a) mixing nitrile rubber (NBR), an ethylene-methyl acrylate copolymer (EMA), an ethylene-vinyl acetate copolymer (EVA), a flame-retardant filler, a crosslinking agent, and optionally any other additives at high temperature, to obtain a polymer blend; and (b) crosslinking the polymer blend under high pressure in a mold, particularly a compression mold.

In one embodiment, the mixing in step (a) according to the present invention may be performed using a mixer, preferably a twin-roll mill, a Banbury mixer, a kneader or an internal mixer, and the mixing temperature may be determined by the melting point or softening point of the polymer.

In one embodiment, step (a) comprises the steps of: mixing a polymer blend, a flame-retardant filler, and optionally any other additives, for example in an internal mixer, preferably at a mixing temperature of 80° C. to 90° C. under the conditions of rotor speed of 30 rpm (revolutions per minute) for 15 minutes or less; and adding a crosslinking agent to the mixture produced in step (a), followed by mixing using a twin-roll mill, preferably at a temperature of 70° C. to 80° C. for 10 minutes or less.

In another embodiment of the present invention, the crosslinking in step (b) is performed at a temperature of 150° C. to 190° C., more preferably 160° C. to 180° C., during a crosslinking time of 1 to 60 minutes, more preferably 5 to 20 minutes, preferably at a pressure of 7 to 18 MPa.

Cable

The cable according to the present invention comprises a crosslinked layer obtained from the polymer composition according to the present invention. In one embodiment, the cable according to the present invention comprises a conductor, an insulating material surrounding the conductor, and a sheath layer surrounding the insulating material, wherein the sheath layer comprises a crosslinked layer obtained from the polymer composition according to the present invention. In one preferred embodiment, the cable according to the present invention comprises an assembly of a plurality of conductors 10, each being surrounded by an insulating material 20, a bedding layer 30 surrounding said assembly, a braid layer 40 surrounding the bedding layer 30, and a sheath layer 50 surrounding the braid layer 40 (see FIG. 1). Preferably, the cable according to the present invention comprises, as the sheath layer 50, a crosslinked layer obtained from the polymer composition according to the present invention. In one preferred embodiment, the cable according to the present invention is a cable for a ship or an offshore plant. The cable comprising, as a sheath layer, the crosslinked layer according to the present invention has oil resistance and mud resistance suitable for a cable for a ship or an offshore plant, and also has excellent cold resistance, flame retardancy and low smoke generation properties, so that it may be applied to a cable for a ship or an offshore plant.

The present invention also provides a crosslinkable polymer composition for use in a sheath layer of a cable, preferably a cable for a ship or an offshore plant, the crosslinkable polymer composition comprising: an ethylene vinyl acetate (EVA) copolymer, nitrile rubber (NBR), and an ethylene-methyl acrylate (EMA) copolymer; a crosslinking agent; and a flame-retardant filler. The ethylene vinyl acetate copolymer has a vinyl acetate (VA) content of less than 40 wt %, over the total weight of the ethylene vinyl acetate copolymer. The components of the composition according to the present invention are as defined above.

Hereinafter, the present invention will be described in more detail with reference to the following non-limiting examples. In addition, any person skilled in the art can apply various modifications to the examples of the present invention within the scope and spirit of the present invention, and these modifications are intended to be within the scope of the present invention.

EXAMPLES

Preparation of Polymer Composition and Crosslinked Product Thereof According to the Present Invention and Evaluation of Performance Thereof Representative Preparation Example In a representative example for a polymer composition and a crosslinked product thereof according to the present invention, a crosslinked polymer composition having the components and contents shown in Table 1 below was prepared.

TABLE 1

| Components | Proportion (phr) | Contents (wt %) |
|---|---|---|
| Nitrile rubber (acrylonitrile content: 41 wt %) | 45 | 15.3 |
| Ethylene-methyl acrylate copolymer | 30 | 10.2 |
| Ethylene-vinyl acetate copolymer (vinyl acetate content: 28 wt %) | 25 | 8.5 |
| Aluminum hydroxide | 160 | 54.5 |
| Antioxidant | 3 | 1.0 |
| Antiozonant | 0.5 | 0.2 |
| Plasticizer | 15 | 5.1 |
| Processing aid | 3 | 1.0 |
| Inorganic additive | 5 | 1.7 |
| Crosslinking coagent | 4.2 | 1.4 |
| Crosslinking agent | 3.2 | 1.1 |

In Table 1 above, the amounts of the components are expressed in phr, and phr refers to parts by weight based on 100 parts by weight of the polymer blend, the polymer blend being composed of nitrile rubber, ethylene-methyl acrylate copolymer, and ethylene-vinyl acetate copolymer.

In the present invention, the following components excluding a crosslinking agent were mixed together at the mixing ratio shown in Table 1 above by means of an internal mixer at 90° C. for 15 minutes, and a crosslinking agent was added thereto, followed by mixing a twin-roll mill at 80° C. for 10 minutes:
  nitrile rubber (NBR) having an acrylonitrile content of 41 wt %, which is commercially available under the trade name of KNB 40M from Kumho Petrochemical Co., Ltd. (Korea);
  an ethylene-methyl acrylate copolymer (AEM), which is more particularly an amorphous polymer crosslinkable with organic peroxide, commercially available under the trade name of Vamac DP from Dupont;
  an ethylene-methyl acrylate copolymer (EMA), which is more particularly an amorphous polymer crosslinkable with organic peroxide, commercially available under the trade name of Vamac DP from Dupont;
    aluminum hydroxide (having an aluminum hydroxide content of 99.5 wt %, an average particle size of 0.9 μm, and a BET specific surface area of 10 to 11 m²/g) which is commercially available under the trade name of Apyral 120E from Nabaltec;
  an antioxidant, such as an amine-based antioxidant comprising a combination of: acetone diphenylamine condensate which is commercially available under the trade name of BLE-65 from Sunfine Global Co., Ltd. (2 phr), and 2-mercaptobenzimidazole which is commercially available under the trade name of Antage MB from Kawaguchi Chemical Industry Co., Ltd. (1 phr);
  diaryl-p-phenylenediamine (antiozonant) which is commercially available under the trade name of Novazone AS from Uniroyal Chemical Co.;
  diisodecyl phthalate (plasticizer) which is commercially available under the trade name of DIDP from Aekyung Petrochemical Co., Ltd.;
  an aliphatic ester-type polysiloxane-based compound (processing aid) which is commercially available under the trade name of TPX1800 from Iruchem Co., Ltd.;
  zinc oxide (inorganic additive) which is commercially available under the trade name of ZnO from Hanil Chemical Co., Ltd.;
  a crosslinking coagent composed of trimethylolpropane trimethacrylate with a content of 70 wt %, and silica with a content of 30 wt %, which is commercially available under the trade name of Rhenofit TRIM/S from RheinChemie (1.2 phr); and a crosslinking coagent composed of 50 wt % of modified ethylene acrylate and 1,2-polybutadiene and 50 wt % of EPDM binder, which is commercially available under the trade name of Ex-cure 50 from Dae Nong Chem. Corp. (3 phr);
  bis(tert-butylperoxy)diisopropyl benzene (crosslinking agent) which is commercially available under the trade name of Perbutyl P from NOF Corporation.

The obtained mixture was crosslinked in a compression mold for $t_{c90}$ under the conditions of 170° C./12.5 MPa. Next, the mixture was depressurized and cooled naturally in air, thereby preparing a crosslinked product of the crosslinked polymer composition according to the present invention. The $t_{c90}$ was obtained by measuring the time ($t_{c90}$) until reaching 90% torque value of the maximum value of the MDR torque value that increased as the crosslinking reaction occurred in the moving die rheometer (MDR) test defined in ASTM D5289.

Evaluation Method for Mechanical Performances of Crosslinked Product

In order to measure the mechanical performances of the crosslinked product, such as tensile strength and elongation at break, a dumbbell-shaped specimen are prepared in accordance with the standard DIN 53504.S2. Next, the performances are evaluated using a universal tensile tester at a speed of 254 ram/min in accordance with the standard IEC 60811-501. At this time, the tensile strength should be 9.0 N/mm² or more, and the elongation at break should be 120% or more.

Evaluation Method for Heat Resistance Performance of Crosslinked Product

In order to measure the heat resistance performance of the crosslinked product, in accordance with the standard IEC 60811-401, the specimen is kept in a convection heat oven at 120° C. for 168 hours, and then percent changes in the tensile strength and elongation at break of the specimen are measured. At this time, the percent changes should be ±30% or less.

Evaluation Method for Oil Resistance Performance of Crosslinked Product

In order to evaluate the oil resistance performance of the crosslinked product, distillates composed of IRM 902 and IRM 903 paraffinics and naphthenics, defined in the standard ASTM 471, are provided. The aniline point of IRM 902 oil is 90° C. to 96° C., and the aniline point of IRM 903 oil is 69° C. to 71° C. The specimen is immersed in the above distillates at 100° C. for 168 hours, and then percent changes in the tensile strength, elongation at break, weight and volume of the specimen are measured. At this time, the percent changes in tensile strength and elongation at break should be ±30% or less, and the percent changes in weight and volume should be 30% or less.

Evaluation Method for Mud Resistance Performance of Crosslinked Product

In order to evaluate the mud resistance performance of the crosslinked product, in accordance with the standard NEK 606 (2016 revision), an oil-based EDC 95-11 fluid and a water-based calcium bromide ($CaBr_2$) fluid are provided. The EDC 96-11 fluid is a distillate composed of paraffin-based oil (paraffin and cyclic hydrocarbons) and has an aniline point of 85° C. to 94° C. The calcium bromide fluid is composed of 52 wt % calcium bromide and 48 wt % water. The specimen is immersed in the fluids 70° C. for 56 days, and then percent changes in the tensile strength, elongation at break, weight and volume of the specimen are measured. When the specimen was immersed in the EDC 95-11 fluid, the percent changes in tensile strength and elongation at break should be ±30% or less, and the percent changes in weight and volume should be 25% or less. In addition, when the specimen was immersed in the calcium bromide fluid, the percent changes in tensile strength and elongation at break should be ±25% or less, the percent change in weight should be 15% or less, and the percent change in volume should be 20% or less.

Evaluation Method for Ozone Resistance Performance of Crosslinked Product

In order to evaluate the ozone resistance performance of the crosslinked product, in accordance with the standard IEC 60811-403, the specimen is kept in a closed ozone chamber in an environment containing 275 ppm (parts per million) at 25° C. for hours, and then whether the specimen surface would be cracked is examined. When no crack occurred on the surface when viewed visually, the specimen is judged as pass.

Evaluation Method for Cold Resistance Performance of Crosslinked Product

In order to evaluate the cold resistance performance of the crosslinked product, in accordance with the standard IEC 60811-505, the specimen is kept in a closed cold chamber at −30° C. for 4 hours. The cold elongation at break of the specimen is measured using a universal tensile tester. At this time, the speed of the universal tensile tester is 25 ram/min. At this time, the elongation at break should be 30% or more.

Evaluation Method for Flame-Retardant Performance of Crosslinked Product

In order to evaluate the flame-retardant performance of the crosslinked product, the limited oxygen index of the crosslinked product is measured in accordance with the standard ASTM D2863. The specimen is a rectangular shape having a length of 150 mm, a width of 6 mm and a thickness of 3 mm. It is evaluated that the higher the limited oxygen index value of the specimen, the better the flame retardant performance. In general, the limited oxygen index value of a material which is used in the sheath layer of an electric wire or a cable is 32 or more.

Evaluation Method for Cold Resistance Performance of Cable

In order to evaluate the cold resistance performance of a cable comprising a crosslinked layer obtained from the polymer composition, in accordance with the standard CSA 22.2 No. 3, the cable is kept in a closed cold camber at 30° C. for 4 hours, and then the cold bending and cold impact of the cable are evaluated. At this time, when no crack occurred in the crosslinked layer of the cable, the cable is judged as pass.

Evaluation Method for Flame-Retardant Performance of Cable

In order to evaluate the flame-retardant performance of a cable comprising a crosslinked layer obtained from the polymer composition, a flame retardancy test is performed in accordance with the standard IEC 60332-3-22. A cable having a length of 3.5 m is burned in a propane gas burner with a quantity of heat of 70,000 Btu/hour for 40 minutes. At this time, the burned length of the burned length should be 2.5 m or less.

Evaluation Method for Smoke Density Performance of Cable

In order to evaluate the smoke density performance of a cable comprising a crosslinked layer obtained from the polymer composition, a smoke density test is performed in accordance with the standard IEC 61034-2. In a fire source prepared by mixing ethanol, methanol and water, the cable is burned for 40 minutes, and then the smoke density is measured. At this time, the measured smoke density value of the cable should be 60% or more.

Preparation of Composition and Crosslinked Product According to the Present Invention, and Cable Comprising the Same, and Measurement of Performance Thereof In order to examine the above-described properties of crosslinked polymer compositions, according to the same method as the above-described Representative Preparation Example, polymer compositions and crosslinked products thereof were prepared using the components and contents shown in Table 2 below.

In addition, the cable as shown in FIG. 1 was prepared. At this time, each of the compositions of Example 2 according to the present invention and Comparative Examples 1 to 3 was extrusion-molded under pressure on an assembly constituting the braid layer 40, and then chemically crosslinked by steam (with steam pressure of 3 bar to 4 bar) at high temperature (180° C. to 190° C.), thereby forming cable sheath layers.

TABLE 2

| Components | Examples | | | | | Comparative Examples | | |
| --- | --- | --- | --- | --- | --- | --- | --- | --- |
| | 1 | 2 | 3 | 4 | 5 | 1 | 2 | 3 |
| Nitrile rubber (acrylonitrile content: 41 wt %) | 45 | 45 | 45 | 40 | 35 | — | 20 | 35 |
| Ethylene-methyl acrylate copolymer | 25 | 30 | 35 | 40 | 50 | — | — | — |
| Ethylene-vinyl acetate copolymer (vinyl acetate content: 70 wt %) | — | — | — | — | — | 90 | 70 | 55 |
| Ethylene-vinyl acetate copolymer (vinyl acetate content: 28 wt %) | 30 | 25 | 20 | 20 | 15 | 10 | 10 | 10 |

TABLE 2-continued

| Components | Examples | | | | | Comparative Examples | | |
|---|---|---|---|---|---|---|---|---|
| | 1 | 2 | 3 | 4 | 5 | 1 | 2 | 3 |
| Aluminum hydroxide a | 160 | 160 | 160 | 160 | 160 | — | — | — |
| Aluminum hydroxide b | — | — | — | — | — | 120 | 115 | 150 |
| Magnesium hydroxide | — | — | — | — | — | 40 | 35 | — |
| Antioxidant | 3 | 3 | 3 | 3 | 3 | 2 | 2 | 2 |
| Anti-hydrolysis agent | — | — | — | — | — | 2 | 2 | 2 |
| Antiozonant | 0.5 | 0.5 | — | — | — | — | — | — |
| Plasticizer a | 15 | 15 | 15 | 15 | 15 | — | — | — |
| Plasticizer b | — | — | — | — | — | 7 | 7 | — |
| Processing oil | — | — | — | — | — | — | — | 9 |
| Processing aid | 3 | 3 | 3 | 3 | 3 | 3 | 3 | 1 |
| Inorganic additive | 5 | 5 | 5 | 5 | 5 | — | — | 1 |
| Crosslinking coagent | 4.2 | 4.2 | 4.2 | 4.2 | 4.2 | 7.5 | 3.5 | 4 |
| Crosslinking agent | 3.2 | 3.2 | 3.2 | 3.2 | 3.2 | 3.2 | 3.2 | 3 |

In Table 2 above, the amounts of the components are expressed in phr, and phr refers to parts by weight based on 100 parts by weight of the polymer blend, the polymer blend, as the case may be, being composed of:
nitrile rubber, ethylene-methyl acrylate copolymer, and ethylene-vinyl acetate copolymer, or
ethylene-vinyl acetate copolymers, or
nitrile rubber and ethylene-vinyl acetate copolymers.

Details of the components gathered in Table 2 are as follows:
nitrile rubber (NBR) having an acrylonitrile content of 41 wt %, which is commercially available under the trade name of KNB 40M from Kumho Petrochemical Co., Ltd. (Korea);
an ethylene-methyl acrylate copolymer (EMA), which is more particularly an amorphous polymer crosslinkable with organic peroxide, commercially available under the trade name of Vamac DP from Dupont; an ethylene-vinyl acetate copolymer (EVA) having a vinyl acetate content of 70 wt %, which is commercially available under the trade name of Levapren 700HV from Lanxess;
an ethylene-vinyl acetate copolymer, which is more particularly a maleic anhydride-grafted ethylene-vinyl acetate copolymer (MAH-g-EVA), having a vinyl acetate content of 28 wt % and a melt index of 1.5 g/10 min, which is commercially available under the trade name of Fusabond C MC250D from Dupont;
aluminum hydroxide a (having an aluminum hydroxide content of 99.5 wt %, an average particle size of 0.9 μm and a BET specific surface area of 10 to 11 m$^2$/g) which is commercially available under the trade name of Apyral 120E from Nabaltec;
aluminum hydroxide b (having an aluminum hydroxide content of 99.5 wt %, an average particle size of 1 μm and a BET specific surface area of 6 m$^2$/g) which is commercially available under the trade name of Apyral 60CD from Nabaltec;
magnesium hydroxide (having a magnesium hydroxide content of 92 wt %, an average particle size of 5 μm and a BET specific surface area of 7 m$^2$/g) which is commercially available under the trade name of HN 18805A from SL Corporation;
an anti-hydrolysis agent of polycarbodiimide which is commercially available under the trade name of Rhenogran PCD-50 from ReinChemie;
an antiozonant, such as diaryl-p-phenylenediamine which is commercially available under the trade name of Novazone AS from Uniroyal Chemical Co.;
a plasticizer (a) of diisodecyl phthalate which is commercially available under the trade name of DIDP from Aekyung Petrochemical Co., Ltd.;
a plasticizer (b) of dioctyl sebacate which is commercially available under the trade name of ES-DOS from Geo Young Corporation;
a processing oil comprising epoxidized soybean oil, which is commercially available under the trade name of SDB CIZER E-03 from Sajo Haepyo Co., Ltd., and castor oil which is commercially available under the trade name of Castor oil from JiaXing Sicheng Chemical Co., Ltd. (in the Comparative Example, epoxidized soybean oil and castor oil were used in combination);
a processing aid, such as an aliphatic ester-type polysiloxane-based compound which is commercially available under the trade name of TPX1800 from Iruchem Co., Ltd.;
an inorganic additive, such as zinc oxide which is commercially available under the trade name of ZnO from Hanil Chemical Co., Ltd.;
a crosslinking coagent composed of trimethylolpropane trimethacrylate with a content of 70 wt %, and silica with a content of 30 wt %, which is commercially available under the trade name of Rhenofit TRIM/S from RheinChemie (1.2 phr); and a crosslinking coagent composed of 50 wt % of modified ethylene acrylate and 1,2-polybutadiene and 50 wt % of EPDM binder, which is commercially available under the trade name of Ex-cure 50 from Dae Nong Chem. Corp. (3 phr) (for Examples 1 to 5);
a crosslinking coagent composed of 50 wt % of modified ethylene acrylate and 1,2-polybutadiene and 50 wt % of EPDM binder, which is commercially available under the trade name of Ex-cure 50 from Dae Nong Chem. Corp., and a crosslinking coagent composed of 70 wt % of triallyl cyanurate and 30 wt % of a plasticizer and a dispersant, which is commercially available under the tradename of Kettlit TAC/GR-70 from Kettlitz Chemie (For Comparative Examples 1 to 3);
an antioxidant, such as an amine-based antioxidant, comprising a combination of: acetone diphenylamine condensate (antioxidant) which is commercially available under the trade name of BLE-65 from Sunfine Global Co., Ltd. (2 phr), and 2-mercaptobenzimidazole (antioxidant) which is commercially available under the trade name of Antage MB from Kawaguchi Chemical Industry Co., Ltd. (1 phr) (for Examples 1 to 5);
an antioxidant, such as an amine-based antioxidant, composed of 70 wt % of diphenylamine and 30 wt % of silica, under the trade name of Rhenofit DDA-70 from RheinChemie (Comparative Examples 1 to 3).

a crosslinking agent, such as bis(tert-butylperoxy)diisopropyl benzene which is commercially available under the trade name of Perbutyl P from NOF Corporation.

Table 3 shows the results of evaluating the properties of the polymer compositions, the crosslinked products thereof, and the cables comprising the same.

As shown in Table 3 above, the crosslinked polymer compositions according to Examples 1 to 5 of the present invention satisfied all the physical properties, heat aging and chemical resistance properties required according to ship cable standards (IEC 60092-360 SHF 2 grade, 2014 revision) and the oil and mud resistance properties required according to the offshore plant cable standards (NEK 606, 2016 revision). In addition, it was confirmed that Examples

TABLE 3

| | Properties | Standard values | Examples | | | | | Comparative Examples | | |
|---|---|---|---|---|---|---|---|---|---|---|
| | | | 1 | 2 | 3 | 4 | 5 | 1 | 2 | 3 |
| Physical properties at room temperature | Tensile strength (N/mm$^2$) | ≥9.0 | 10.8 | 10.6 | 11.2 | 10.5 | 9.4 | 9.5 | 10.4 | 10.5 |
| | Elongation at break (%) | ≥120 | 155 | 160 | 150 | 145 | 175 | 205 | 177 | 150 |
| Heat aging | Change (%) in tensile strength | ±30 | 29 | 16 | 27 | 25 | 15 | 20 | 24 | 14 |
| | Change (%) in elongation at break | ±30 | −21 | −10 | 4 | 3 | −19 | 4 | −9 | −23 |
| Properties against IRM 902 oil | Change (%) in tensile strength | ±30 | 5 | −1 | 4 | −3 | −11 | −1 | 2 | 4 |
| | Change (%) in elongation at break | ±30 | −7 | 3 | −15 | −2 | −16 | 6 | 6 | 7 |
| | Change (%) in weight | ≤30 | 13 | 12 | 10 | 13 | 13 | 10 | 10 | 10 |
| | Change (%) in volume | ≤30 | 21 | 18 | 15 | 21 | 20 | 16 | 15 | 15 |
| Properties against IRM 903 oil | Change (%) in tensile strength | ±30 | −22 | −23 | −17 | −14 | −21 | −12 | −6 | −18 |
| | Change (%) in elongation at break | ±30 | −28 | −16 | −26 | −17 | −23 | −26 | −16 | −7 |
| | Change (%) in weight | ≤30 | 18 | 16 | 14 | 18 | 18 | 18 | 17 | 17 |
| | Change (%) in volume | ≤30 | 30 | 27 | 24 | 30 | 29 | 29 | 26 | 26 |
| Properties against EDC 95-11 mud | Change (%) in tensile strength | ±30 | −18 | −10 | −5 | 1 | −6 | −7 | −3 | −10 |
| | Change (%) in elongation at break | ±30 | −12 | −13 | −8 | −11 | −3 | −12 | −11 | −7 |
| | Change (%) in weight | ≤25 | 7 | 5 | 4 | 6 | 7 | 7 | 5 | 5 |
| | Change (%) in volume | ≤25 | 15 | 12 | 8 | 14 | 15 | 15 | 11 | 10 |
| Properties against calcium bromide mud | Change (%) in tensile strength | ±25 | −2 | −4 | 2 | −6 | 9 | −3 | 1 | −7 |
| | Change (%) in elongation at break | ±25 | −9 | −13 | 5 | −1 | −19 | 2 | 10 | 21 |
| | Change (%) in weight | ≤15 | 3 | 1 | 0 | 3 | 2 | 1 | 1 | 3 |
| | Change (%) in volume | ≤20 | 6 | 1 | 0 | 6 | 5 | 1 | 3 | 5 |
| Property against ozone | Crack on surface | Pass/fail | Pass | Pass | Pass | Pass | Pass | Pass | Pass | Pass |
| Cold resistance property | Elongation at break (%) | ≥30 | 40 | 32 | 30 | 39 | 43 | 7 | 10 | 7 |
| Flame-retardant property | Limited oxygen index (%) | ≥32 | 34.0 | 35.5 | 36.0 | 36.0 | 34.5 | 33.5 | 33.0 | 32.5 |
| Cold resistance performance of cable (cold bending/cold impact) | | Pass/fail | — | Pass | — | — | — | Fail | Fail | Fail |
| Flame-retardant performance of cable (burned length (m) of cable) | | ≤2.5 | — | 0.9 | — | — | — | 1.2 | 1.7 | 1.9 |
| Smoke density performance of cable (smoke density (%) of cable) | | ≥60 | — | 82 | — | — | — | 79 | 76 | 74 |

1 to 5 of the present invention showed better cold resistance and flame-retardant properties than Comparative Examples 1 to 3, and Example 3 of the present invention showed better oil resistance and mud resistance than Comparative Examples 1 to 3.

In addition, it can be confirmed that the cable according to the present invention has improved cold resistance performance, flame-retardant performance and low smoke generation properties.

As described above, the crosslinked layer obtained from the polymer composition according to the present invention has halogen-free properties, flame retardancy and low smoke generation properties, which are required for cables, and also has high price competitiveness, processability and mechanical properties. Thus, the crosslinked layer may be used to produce a sheath layer for a cable.

In addition, the crosslinked layer obtained from the polymer composition according to the present invention has high oil resistance and mud resistance. Thus, when the crosslinked layer according to the present invention is used as a sheath layer for a cable, the weight or volume or mechanical properties of the sheath layer of the cable can be suppressed from being reduced in a surrounding environment exposed to oil and mud. Thus, the crosslinked layer can be used for cables required to have resistance to oil and mud, such as those that are used in oil rigs, oil carriers, etc.

What is claimed is:

1. A cable comprising a crosslinked layer obtained from a polymer composition, the polymer composition comprising:
   a polymer blend comprising an ethylene vinyl acetate (EVA) copolymer, nitrile rubber (NBR), and an ethylene-methyl acrylate (EMA) copolymer;
   a crosslinking agent; and
   a flame-retardant filler,
   wherein the ethylene vinyl acetate copolymer has a vinyl acetate (VA) content of less than 40 wt %, over the total weight of the ethylene vinyl acetate copolymer,
   wherein the polymer blend comprises, based on 100 parts by weight of the polymer blend, 15 to 30 parts by weight of the ethylene-vinyl acetate copolymer, 35 to 45 parts by weight of the nitrile rubber, and 25 to 50 parts by weight of the ethylene-methyl acrylate copolymer.

2. The cable of claim 1, wherein the nitrile rubber is selected from among nitrile rubber having an acrylonitrile content of 42 to 46 wt %, nitrile rubber having an acrylonitrile content of 36 to 41 wt %, and nitrile rubber having an acrylonitrile content of 31 to 35 wt %, over the total weight of the nitrile rubber.

3. The cable of claim 1, wherein the ethylene methyl acrylate copolymer is an amorphous polymer, and has an absorbance ratio of 1 to 6 as calculated by the following equation 1:

$$\text{Absorbance ratio} = (\text{absorbance by C=O stretch bond})/(\text{absorbance by C—H stretch bond})$$

4. The cable of claim 1, wherein the ethylene-vinyl acetate copolymer comprises a modified ethylene-vinyl acetate copolymer grafted with a polar group-containing compound.

5. The cable of claim 1, wherein the polymer composition comprises, as the flame-retardant filler, aluminum hydroxide ($Al(OH)_3$), magnesium hydroxide ($Mg(OH)_2$), or a mixture thereof.

6. The cable of claim 1, wherein the polymer composition comprises organic peroxide as the crosslinking agent.

7. The cable of claim 1, wherein the polymer composition further comprises one or more additives selected from the group consisting of a crosslinking coagent, a plasticizer, a processing aid, an antioxidant, an antiozonant, and an inorganic additive.

8. The cable of claim 1, wherein the polymer composition comprises 100 parts by weight of the polymer blend, 120 to 180 parts by weight of the flame-retardant filler, 0.5 to 10 parts by weight of the crosslinking agent, 0.5 to 7 parts by weight of a crosslinking coagent, 5 to 20 parts by weight of a plasticizer, 0.5 to 5 parts by weight of a processing agent, 0.5 to 7 parts by weight of an antioxidant, 0.1 to 5 parts by weight of an antiozonant, and 1 to 20 parts by weight of an inorganic additive, wherein the parts by weight are based on 100 parts by weight of the polymer blend.

9. The cable of claim 1, wherein the crosslinked layer is a sheath layer.

10. The cable of claim 1, wherein the cable is a cable for a ship or an offshore plant.

11. A crosslinkable polymer composition for use in a cable, the crosslinkable polymer composition comprising: a polymer blend comprising an ethylene vinyl acetate (EVA) copolymer, nitrile rubber (NBR), and an ethylene-methyl acrylate (EMA) copolymer; a crosslinking agent; and a flame-retardant filler,
    wherein the ethylene vinyl acetate copolymer has a vinyl acetate (VA) of less than 40 wt % over the total weight of the ethylene vinyl acetate copolymer,
    wherein the polymer blend comprises, based on 100 parts by weight of the polymer blend, 15 to 30 parts by weight of the ethylene-vinyl acetate copolymer, 35 to 45 parts by weight of the nitrile rubber, and 25 to 50 parts by weight of the ethylene-methyl acrylate copolymer.

12. The crosslinkable polymer composition of claim 11, which is for use in a cable for a ship or an offshore plant.

13. The crosslinkable polymer composition of claim 11, which is for use in a sheath layer of a cable.

14. A cable comprising a crosslinked layer obtained from a polymer composition, the polymer composition comprising:
    a polymer blend comprising an ethylene vinyl acetate (EVA) copolymer, nitrile rubber (NBR), and an ethylene-methyl acrylate (EMA) copolymer;
    a crosslinking agent; and
    a flame-retardant filler,
    wherein the ethylene vinyl acetate copolymer has a vinyl acetate (VA) content of less than 40 wt %, over the total weight of the ethylene vinyl acetate copolymer,
    wherein the polymer composition comprises 100 parts by weight of the polymer blend, 120 to 180 parts by weight of the flame-retardant filler, 0.5 to 10 parts by weight of the crosslinking agent, 0.5 to 7 parts by weight of a crosslinking coagent, 5 to 20 parts by weight of a plasticizer, 0.5 to 5 parts by weight of a processing agent, 0.5 to 7 parts by weight of an antioxidant, 0.1 to 5 parts by weight of an antiozonant, and 1 to 20 parts by weight of an inorganic additive, wherein the parts by weight are based on 100 parts by weight of the polymer blend.

15. A crosslinkable polymer composition for use in a cable, the crosslinkable polymer composition comprising: a polymer blend comprising an ethylene vinyl acetate (EVA) copolymer, nitrile rubber (NBR), and an ethylene-methyl acrylate (EMA) copolymer; a crosslinking agent; and a flame-retardant filler, wherein the ethylene vinyl acetate copolymer has a vinyl acetate (VA) of less than 40 wt % over the total weight of the ethylene vinyl acetate copolymer, wherein the polymer composition comprises 100 parts by weight of the polymer blend, 120 to 180 parts by weight of the flame-retardant filler, 0.5 to 10 parts by weight of the crosslinking agent, 0.5 to 7 parts by weight of a crosslinking coagent, 5 to 20 parts by weight of a plasticizer, 0.5 to 5 parts by weight of a processing agent, 0.5 to 7 parts by weight of an antioxidant, 0.1 to 5 parts by weight of an antiozonant, and 1 to 20 parts by weight of an inorganic additive, wherein the parts by weight are based on 100 parts by weight of the polymer blend.

16. The crosslinkable polymer composition of claim 15, which is for use in a cable for a ship or an offshore plant.

17. The crosslinkable polymer composition of claim 15, which is for use in a sheath layer of a cable.

* * * * *